(12) United States Patent
Kim et al.

(10) Patent No.: US 11,515,091 B2
(45) Date of Patent: Nov. 29, 2022

(54) MULTILAYER CAPACITOR

(71) Applicant: SAMSUNG ELECTRO-MECHANICS CO., LTD., Suwon-si (KR)

(72) Inventors: Jeong In Kim, Suwon-si (KR); Min Jun Kim, Suwon-si (KR); Byung Kil Seo, Suwon-si (KR); Mi Ok Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 7 days.

(21) Appl. No.: 16/901,534

(22) Filed: Jun. 15, 2020

(65) Prior Publication Data

US 2021/0082621 A1    Mar. 18, 2021

(30) Foreign Application Priority Data

Sep. 17, 2019  (KR) .................. 10-2019-0114337
May 14, 2020  (KR) .................. 10-2020-0057564

(51) Int. Cl.
*H01G 4/12*     (2006.01)
*H01G 4/30*     (2006.01)
(Continued)

(52) U.S. Cl.
CPC .............. *H01G 4/12* (2013.01); *H01G 2/065* (2013.01); *H01G 4/012* (2013.01); *H01G 4/30* (2013.01)

(58) Field of Classification Search
CPC ............ H01G 4/12; H01G 2/06; H01G 2/065; H01G 4/005; H01G 4/012; H01G 4/232;
(Continued)

(56) References Cited

U.S. PATENT DOCUMENTS 9,984,824 B2   5/2018 Tanaka et al.
10,840,008 B2  11/2020 Kainuma et al.
(Continued)

FOREIGN PATENT DOCUMENTS

CN    106356189 A    1/2017
JP    2000-299243 A  10/2000
(Continued)

OTHER PUBLICATIONS

Office Action issued in corresponding Chinese Patent Application No. 202010806785.7 dated Sep. 20, 2022, with English translation.

*Primary Examiner* — Michael P McFadden
(74) *Attorney, Agent, or Firm* — Morgan, Lewis & Bockius LLP

(57) ABSTRACT

A multilayer capacitor includes a capacitor body in which a first capacitor portion and a second capacitor portion are disposed to face each other with a connection region disposed therebetween, the connection portion having a predetermined thickness in which an internal electrode is not formed. The first capacitor portion comprises first and second internal electrodes that are alternately disposed with a dielectric layer interposed therebetween, and the second capacitor portion comprises third and fourth internal electrodes that are alternately disposed with a dielectric layer interposed therebetween. First and second external electrodes connected to the internal electrodes respectively comprise first and second internal layers containing copper (Cu), and first and second external layers containing silver (Ag) or nickel (Ni), and palladium (Pd).

16 Claims, 5 Drawing Sheets

(51) Int. Cl.
*H01G 2/06* (2006.01)
*H01G 4/012* (2006.01)

(58) Field of Classification Search
CPC ............ H01G 4/30; H01G 4/38; H01G 4/248; H05K 1/182
See application file for complete search history.

(56) References Cited

U.S. PATENT DOCUMENTS

| | | | |
|---|---|---|---|
| 2004/0140595 A1* | 7/2004 | Mihara | H01C 17/006 156/89.12 |
| 2004/0176239 A1* | 9/2004 | Nakamura | H01G 4/1227 501/138 |
| 2013/0128411 A1* | 5/2013 | Tahara | H01G 4/12 361/321.2 |
| 2013/0242462 A1 | 9/2013 | Kawano et al. | |
| 2014/0022691 A1 | 1/2014 | Kwag et al. | |
| 2014/0133064 A1 | 5/2014 | Ahn et al. | |
| 2015/0146343 A1* | 5/2015 | Ellmore | H01G 2/103 361/301.4 |
| 2016/0099110 A1* | 4/2016 | Lee | C09D 5/24 252/514 |
| 2016/0212850 A1* | 7/2016 | Kainuma | H01F 17/0013 |
| 2017/0018363 A1* | 1/2017 | Tanaka | H01G 4/30 |
| 2017/0164466 A1* | 6/2017 | Park | H01G 4/018 |
| 2017/0316883 A1* | 11/2017 | Yamaguchi | H01G 4/1227 |
| 2018/0012706 A1* | 1/2018 | Bultitude | H01G 4/012 |
| 2018/0330884 A1* | 11/2018 | Chang | H01G 2/065 |

FOREIGN PATENT DOCUMENTS

| | | |
|---|---|---|
| JP | 2016-136614 A | 7/2016 |
| KR | 10-2014-0060392 A | 5/2014 |
| KR | 10-1831322 B1 | 2/2018 |

\* cited by examiner

MULTILAYER CAPACITOR

CROSS-REFERENCE TO RELATED APPLICATION(S)

This application claims benefit of priority to Korean Patent Application No. 10-2019-0114337 filed on Sep. 17, 2019 and Korean Patent Application No. 10-2020-0057564 filed on May 14, 2020 in the Korean Intellectual Property Office, the disclosures of which are incorporated herein by reference in their entireties.

BACKGROUND

1. Field

The present disclosure relates to a multilayer capacitor.

2. Description of Related Art

As a trend of multifunctionality, lightweightness, and miniaturization of electronic products is rapidly progressing, the demand for miniaturized, high-performance electronic components is increasing.

Additionally, the demand for electronic components providing high reliability for use in electronics and industrial applications such as networks is greatly increasing.

As such, a competition for technological development of passive components to meet market demand is accelerating, and in particular, demand for multilayer capacitors having improved electrical characteristics and reliability is high.

The multilayer capacitor is largely comprised of a dielectric layer based on $BaTiO_3$ (BT), an internal electrode based on a metal, and an external electrode including metal, glass, and the like, for capacitance implementation.

Recently, a lot of effort has been made to improve high temperature, high pressure, moisture resistance reliability, and the like, of the multilayer capacitor by developing high-capacity products and improving microstructures based on thinning of dielectric layers and internal electrodes.

In addition, in a general multilayer capacitor, a plating layer of an external electrode is formed of a nickel plating layer and a tin plating layer, and a solder (Sn-base solder) containing tin is used when mounting on the substrate.

However, in the case of the solder containing tin, a problem such as cracks may occur when a product requires high temperature reliability of 150° C. or higher, and recently, a conductive adhesive mainly comprised of epoxy and a metallic filler as a bonding material has mainly been used.

However, when the conductive adhesive is used as the bonding material, when a plating layer of the external electrode is comprised of tin, bonding strength between the conductive adhesive and the plating layer may be lowered, which may cause a problem of increasing mounting failure of the multilayer capacitor.

SUMMARY

An aspect of the present disclosure is to provide a multilayer capacitor capable of enhancing high-temperature reliability, when mounting the multilayer capacitor on a substrate using a conductive adhesive.

According to an aspect of the present disclosure, a multilayer capacitor includes a capacitor body in which a first capacitor portion and a second capacitor portion are disposed to face each other with a connection region disposed therebetween, the connection region having a predetermined thickness in which no internal electrode is disposed. First and second external electrodes are disposed on respective end portions of the capacitor body opposite each other in a longitudinal direction. The first capacitor portion includes first and second internal electrodes alternately disposed and exposed through respective surfaces of the first capacitor portion opposing each other in the longitudinal direction, and having a dielectric layer interposed between the first and second internal electrodes. The second capacitor portion includes third and fourth internal electrodes alternately disposed and exposed through respective surfaces of the second capacitor portion opposing each other in the longitudinal direction, and having a dielectric layer interposed between the third and fourth internal electrodes. The predetermined thickness of the connection region is larger than thicknesses of the dielectric layers of the first and second capacitor portions. The first external electrode includes a first internal layer connected to the first and third internal electrodes and containing copper (Cu), and a first external layer covering the first internal layer and containing silver (Ag) and palladium (Pd), and the second external electrode includes a second internal layer connected to the second and fourth internal electrodes and containing copper, and a second external layer covering the second internal layer and containing silver and palladium.

In an embodiment of the present disclosure, the number of laminated layers of the first and second internal electrodes may be greater than the number of laminated layers of the third and fourth internal electrodes.

In an embodiment of the present disclosure, the capacitor body may have a surface, adjacent to the second capacitor portion, as a mounting surface.

In an embodiment of the present disclosure, the capacitor body may include a first surface and a second surface opposing each other, a third surface and a fourth surface connected to the first and second surfaces and opposing each other, and a fifth surface and a sixth surface connected to the first and second surfaces and connected to the third and fourth surfaces and opposing each other, and first and second internal layers of the first and second external electrodes may respectively include first and second connection portions disposed on the third and fourth surfaces of the capacitor body, respectively, and connected to exposed portions of the internal electrodes, and first and second band portions extending from the first and second connection portions, respectively, to a portion of the first surface of the capacitor body.

In an embodiment of the present disclosure, the first and second external layers of the first and second external electrodes may respectively include third and fourth connection portions disposed on the first and second connection portions, respectively, and third and fourth band portions extending from the third and fourth connection portions, respectively, to respectively cover the first and second band portions.

According to another aspect of the present disclosure, a multilayer capacitor includes a capacitor body in which a first capacitor portion and a second capacitor portion are disposed to face each other with a connection region disposed therebetween, the connection region having a predetermined thickness in which no internal electrode is disposed. First and second external electrodes are disposed on respective end portions of the capacitor body opposite each other in a longitudinal direction. The first capacitor portion includes first and second internal electrodes alternately disposed and exposed through respective surfaces of the first capacitor portion opposing each other in the longitudinal direction, and having a dielectric layer interposed between the first and second internal electrodes. The second capacitor portion includes third and fourth internal electrodes alternately disposed and exposed through respective surfaces of the second capacitor portion opposing each other in the longitudinal direction, and having a dielectric layer interposed between the third and fourth internal electrodes. The predetermined thickness of the connection region is larger than thicknesses of the dielectric layers of the first and second capacitor portions. The first external electrode includes a first internal layer connected to the first and third internal electrodes and containing copper, a first intermediate layer covering the first internal layer and containing nickel (Ni), and a first external layer covering the first intermediate layer and containing palladium, and the second external electrode includes a second internal layer connected to the second and fourth internal electrodes and containing copper, a second intermediate layer covering the second internal layer and containing nickel, and a second external layer covering the second intermediate layer and containing palladium.

In an embodiment of the present disclosure, the first and second intermediate layers and the first and second external layers may be plating layers.

In an embodiment of the present disclosure, the first and second intermediate layers of the first and second external electrodes may respectively include fifth and sixth connection portions disposed on the first and second connection portions, respectively, and fifth and sixth band portions extending from the fifth and sixth connection portions, respectively, to respectively cover the first and second band portions.

In an embodiment of the present disclosure, the first and second external layers of the first and second external electrodes may respectively include third and fourth connection portions disposed on the fifth and sixth connection portions, respectively, and third and fourth band portions extending from the third and fourth connection portions, respectively, to respectively cover the fifth and sixth band portions.

According to another aspect of the disclosure, a multilayer capacitor includes a capacitor body having a first capacitor portion including first and second internal electrodes stacked with a first dielectric layer therebetween, a second capacitor portion including third and fourth internal electrodes stacked with a second dielectric layer therebetween, and a connection region free of internal electrodes, disposed between the first and second capacitor portions, and having a larger thickness than the first and second dielectric layers. A first multi-layer electrode connects the first and third internal electrodes of the first and second capacitor portions to each other, the first multi-layer electrode including an internal layer containing copper (Cu) and an external layer containing palladium (Pd). A second multi-layer electrode connects the second and fourth internal electrodes of the first and second capacitor portions to each other, the second multi-layer electrode including an internal layer containing copper (Cu) and an external layer containing palladium (Pd).

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
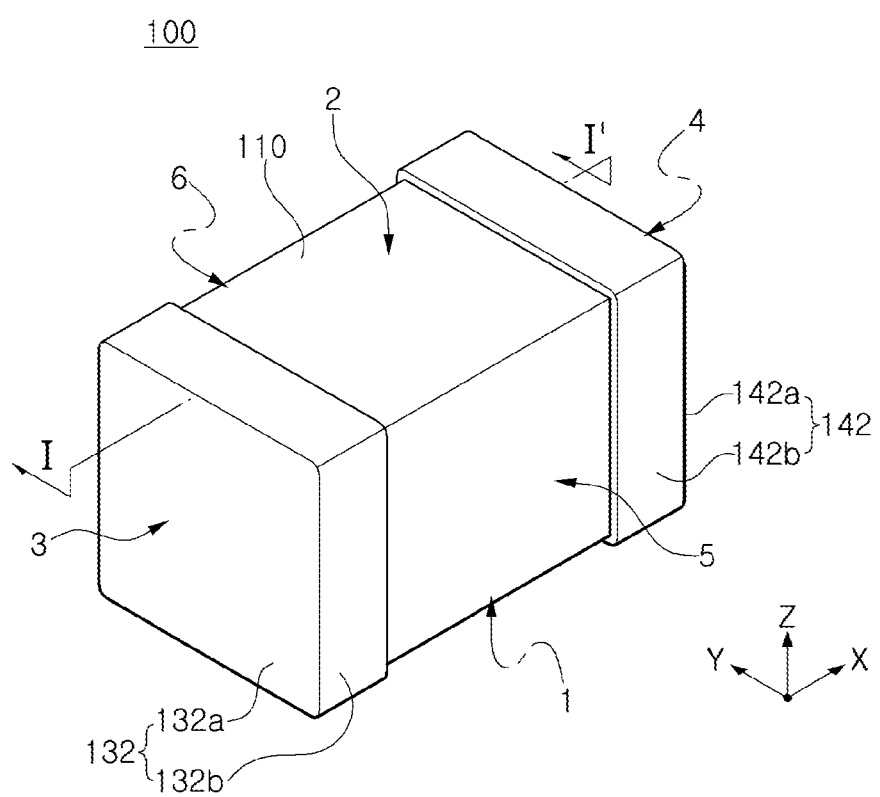
FIG. 1 is a schematic perspective view illustrating a multilayer capacitor according to an embodiment of the present disclosure.

Hereinafter, embodiments of the present disclosure will be described in detail with reference to the accompanying drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

In the drawings, the shape and dimensions of elements may be exaggerated for clarity.

Further, in the drawings, elements having the same functions within the same scope of the inventive concept will be designated by the same reference numerals.

Hereinafter, when a direction of a capacitor body 110 is defined to clearly explain an embodiment in the present disclosure, X, Y and Z shown in figures represent a length direction, a width direction, and a thickness direction of the capacitor body 110, respectively. Further, in the present embodiment, the Z direction may be conceptually the same as a lamination direction in which dielectric layers are laminated.

In addition, in the present embodiment, for convenience of description, upper and lower surfaces of the capacitor body 110 in the Z direction are defined as first and second surfaces 1 and 2, respectively, opposing surfaces of the capacitor body 110 in the X direction are defined as third and fourth surfaces 3 and 4, respectively, and opposing surfaces of the capacitor body 110 in the Y direction are defined as fifth and sixth surfaces 5 and 6, respectively. Here, a mounting surface may be the first surface 1 of the capacitor body 110.

Figure 2A:
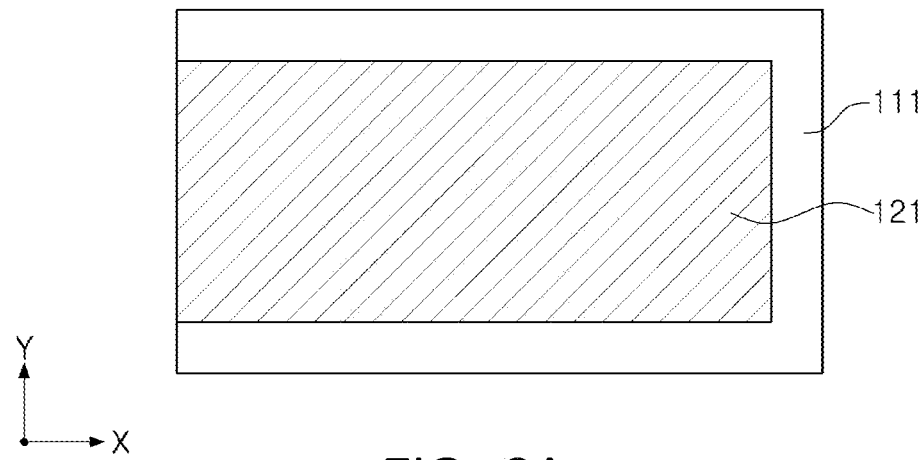
FIGS. 2A and 2B are plan views illustrating a structure of the first and second internal electrodes of the multilayer capacitor of FIG. 1, respectively.
Figure 2B:
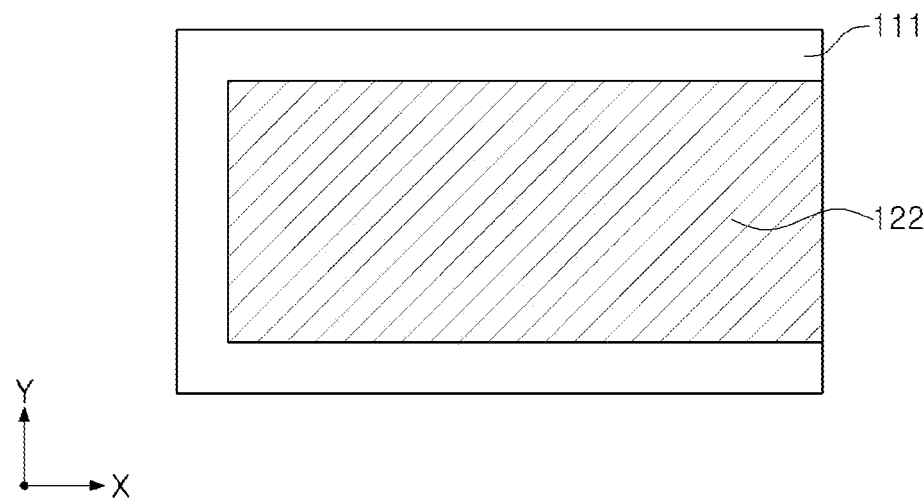
Figure 3A:
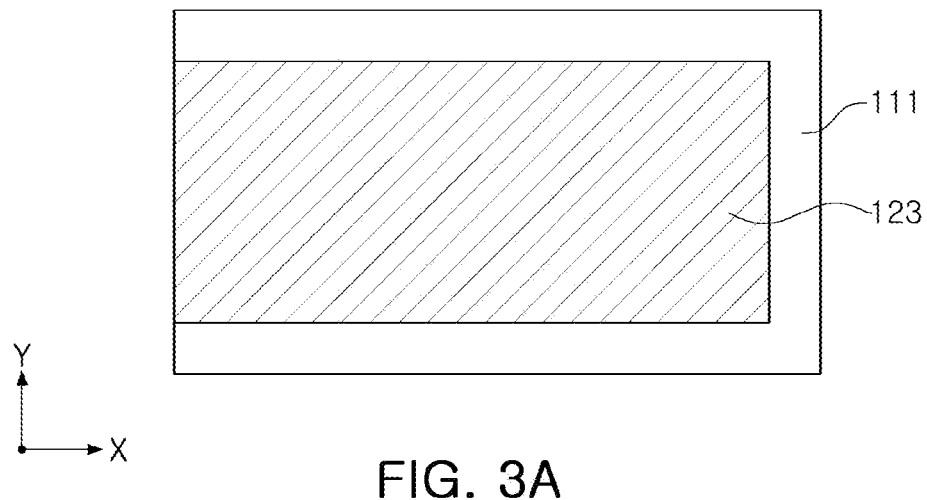
FIGS. 3A and 3B are plan views illustrating a structure of the third and fourth internal electrodes of the multilayer capacitor of FIG. 1, respectively.
Figure 3B:
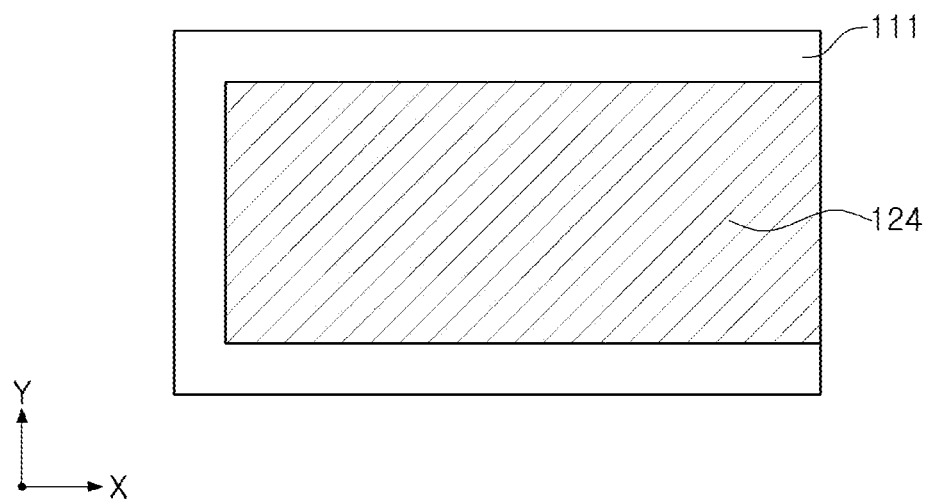
Figure 4:
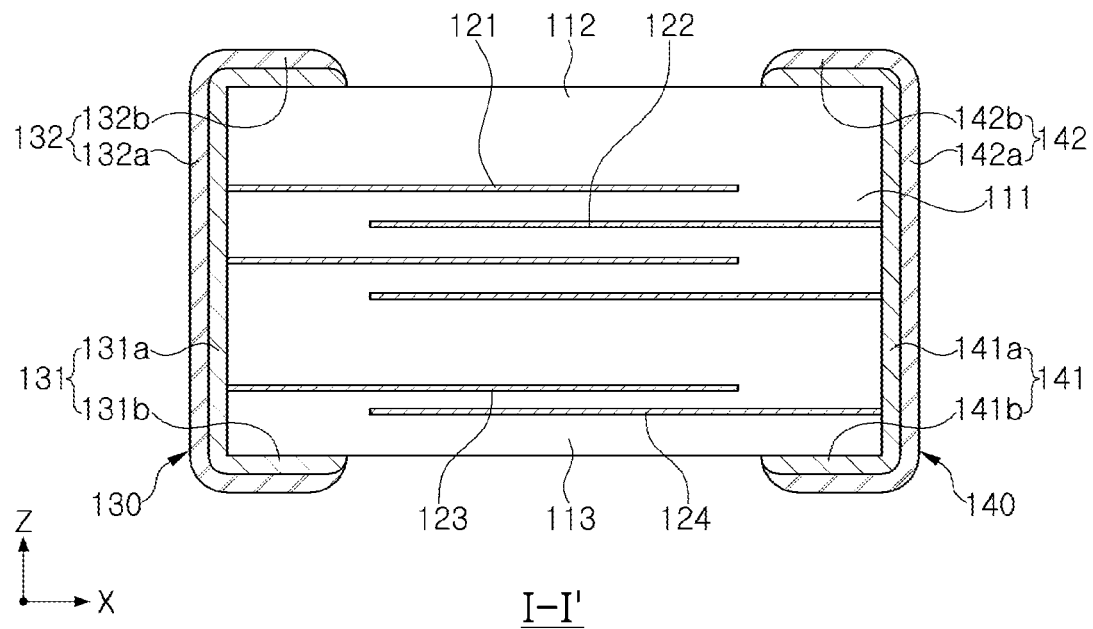
FIG. 4 is a cross-sectional view taken along line I-I' of the multilayer capacitor of FIG. 1.

FIG. 1 is a schematic perspective view illustrating a multilayer capacitor according to an embodiment of the present disclosure, FIGS. 2A and 2B are plan views illustrating a structure of the first and second internal electrodes in FIG. 1, respectively, FIGS. 3A and 3B are plan views illustrating a structure of the third and fourth internal electrodes in FIG. 1, respectively, and FIG. 4 is a cross-sectional view taken along line I-I' of FIG. 1.

Referring to FIGS. 1, 2A, 2B, 3A, 3B, and 4, a multilayer capacitor 100 according to an embodiment of the present disclosure includes a capacitor body 110 in which a first capacitor portion and a second capacitor portion are disposed to face each other with a connection region disposed therebetween and having a predetermined thickness in which an internal electrode is not formed, and first and second external electrodes 130 and 140 formed at both end portions of the capacitor body 110 in a longitudinal direction.

The capacitor body 110 is formed by laminating a plurality of dielectric layers 111 and then sintering the plurality of dielectric layers 111, and shape, dimensions, and the number of laminated layers of the dielectric layers of the capacitor body 110 are not limited to those shown in the present embodiment.

The dielectric layer 111 may include ceramic powder having a high dielectric constant, for example, may include barium titanate (BaTiO$_3$)-based ceramic powder, or strontium titanate (SrTiO$_3$)-based ceramic powder. However, the present disclosure is not limited thereto.

In this case, in the present embodiment, the dielectric layers may be laminated in the Z direction to have internal electrodes that are horizontal with respect to the first surface, which is a mounting surface.

In addition, the plurality of dielectric layers 111 forming the capacitor body 110 may be in a sintered state, and boundaries between the adjacent dielectric layers 111 may be integrated, such that they may be difficult to confirm without using a scanning electron microscope (SEM).

In this case, the capacitor body 110 may have a generally hexahedral shape, but the present disclosure is not limited thereto. In addition, the shape and dimensions of the capacitor body 110 and the number of laminated layers of the dielectric layer 111 are not limited to those illustrated in the drawings of the present embodiment.

In the present embodiment, for convenience of explanation, both surfaces of the capacitor body 110 opposing each other in the Z direction are defined as first and second surfaces 1 and 2, both surfaces connected to the first and second surfaces 1 and 2 and opposing each other in the X direction are defined as third and fourth surfaces 3 and 4, and both surfaces connected to the first and second surfaces 1 and 2, connected to the third and fourth surfaces 3 and 4, and opposing each other in the Y direction are defined as fifth and sixth surfaces 5 and 6.

The dielectric layer 111 may include a ceramic material having a high dielectric constant, for example, a barium titanate (BaTiO$_3$)-based ceramic powder, a strontium titanate (SrTiO$_3$)-based ceramic powder, or the like. However, the present disclosure is not limited thereto as long as sufficient capacitance may be obtained therewith.

In addition, a ceramic additive, an organic solvent, a plasticizer, a binding agent, a dispersant, and the like, may further be added to the dielectric layer 111, together with the ceramic powder.

As the ceramic additive, for example, a transition metal oxide or a transition metal carbide, a rare earth element, magnesium (Mg), aluminum (Al), or the like, may be used.

In addition, the capacitor body 110 may have different impedance characteristics, including a first capacitor portion as a high-capacity region and a second capacitor portion as a low capacity and high ESR region, and a connection region having a predetermined thickness in which no internal electrodes are formed that may be disposed between the first capacitor portion and the second capacitor portion to implement low ESL characteristics.

In this case, the capacitor body 110 may have a first surface 1, adjacent to the second capacitor portion, as a mounting surface.

An upper cover 112 may be disposed in an upper portion of the first capacitor portion, and a lower cover 113 may be disposed in a lower portion of the second capacitor portion.

The first capacitor portion may be formed by repeatedly laminating the plurality of first and second internal electrodes 121 and 122 in the Z direction with the dielectric layers 111 interposed therebetween as a capacitance contributing portion.

Referring to FIGS. 2A and 2B, the first and second internal electrodes 121 and 122 are electrodes having different polarities. The first and second internal electrodes 121 and 122 may be formed by printing a conductive paste including a conductive metal on the dielectric layers 111 to a predetermined thickness, and may be alternately disposed in a horizontal direction with respect to the first surface 1 along a laminated direction of the dielectric layers 111. For example, the first and second internal electrodes 121 and 122 may be parallel to the first surface 1. The first and second internal electrodes 121 and 122 may be disposed such that one end portion of each first internal electrode 121 is exposed through the third surface 3 and one end portion of each second internal electrode 122 is exposed through the fourth surface 4.

In this case, the first and second internal electrodes 121 and 122 may be electrically insulated from each other by the dielectric layers 111 disposed in the middle.

In addition, the first and second internal electrodes 121 and 122 may be formed to have a predetermined width as a whole, and thus may have a structure in which ESR is not greatly increased.

In addition, the first and second internal electrodes 121 and 122 may be electrically connected to the first and second external electrodes 130 and 140, respectively, through end portions respectively exposed through the third and fourth surfaces 3 and 4 of the capacitor body 110.

Therefore, when a voltage is applied to the first and second external electrodes 130 and 140, charges are accumulated between the first and second internal electrodes 121 and 122 opposing each other, and in this case, the capacitance of the multilayer capacitor 100 may be proportional to an area of a region of overlap between the first and second internal electrodes 121 and 122.

In addition, a material for forming the first and second internal electrodes 121 and 122 is not particularly limited. For example, the first and second internal electrodes 121 and 122 may be formed using precious metal materials such as platinum (Pt), palladium (Pd), palladium-silver (Pd—Ag) alloys, and the like, and a conductive paste made of at least one of nickel (Ni) and copper (Cu).

In this case, a printing method of the conductive paste may be a screen printing method, a gravure printing method, or the like, and the present disclosure is not limited thereto.

The second capacitor portion is formed by repeatedly laminating a plurality of third and fourth internal electrodes 123 and 124 with the dielectric layers 111 interposed therebetween.

In this case, the second capacitor portion may have a thickness thinner than the first capacitor portion. To achieve the thinner thickness, when an interval or thickness spacing between the internal electrodes is similar, the number of laminated layers of the first and second internal electrodes 121 and 122 may be greater than the number of laminated layers of the third and fourth internal electrodes 123 and 124.

When an internal electrode of the second capacitor portion is additionally disposed, a length of a circuit may be reduced when the multilayer capacitor is mounted on the substrate, and in particular, the ESL of the multilayer capacitor, especially at high frequencies, may be reduced.

Referring to FIGS. 3A and 3B, the third and fourth internal electrodes 123 and 124 are electrodes having different polarities. The third and fourth internal electrodes 123 and 124 may be formed by printing a conductive paste containing a conductive metal to a predetermined thickness on the dielectric layers 111, and may be alternately disposed in a horizontal direction with respect to the first surface 1 in the lamination direction of the dielectric layers 111. For example, the third and fourth internal electrodes 123 and 124 may be parallel to the first surface 1. The third and fourth internal electrodes 123 and 124 may be formed such that one end portion of each third internal electrode 123 is exposed through the third surface 3 and one end portion of each fourth internal electrode 124 is exposed through the fourth surface 4.

In this case, the third and fourth internal electrodes 123 and 124 may be electrically insulated from each other by the dielectric layers 111 interposed therebetween.

Therefore, when a voltage is applied to the first and second external electrodes 130 and 140, charges are accumulated between the third and fourth internal electrodes 123 and 124 opposing each other, and in this case, the capacitance of the multilayer capacitor 100 is proportional to the area of the overlapping regions of the third and fourth internal electrodes 123 and 124.

In addition, a material for forming the third and fourth internal electrodes 123 and 124 is not particularly limited, and for example, may be formed using precious metal materials such as platinum (Pt), palladium (Pd), palladium-silver (Pd—Ag) alloys, and the like, and a conductive paste made of one or more materials of nickel (Ni) and copper (Cu).

In this case, a printing method of the conductive paste may be a screen-printing method, a gravure method, or the like, and the present disclosure is not limited thereto.

An upper cover 112, a lower cover 113, and a connection region may have the same material and configuration as those of the dielectric layers 111 of the first capacitor portion except that they do not include any internal electrodes.

The upper cover 112 may be formed by stacking a single dielectric layer 111 or two or more dielectric layers 111 on an upper surface of the first capacitor portion, and basically, the upper cover 112 may prevent the first and second internal electrodes 121 and 122 of the first capacitor portion from being damaged by physical or chemical stress.

The lower cover 113 may be formed by stacking a single dielectric layer 111 or two or more dielectric layers 111 on a lower surface of the second capacitor portion, and basically, the lower cover 113 may prevent the third and fourth internal electrodes 123 and 124 of the second capacitor portion from being damaged by physical or chemical stress.

The connection region includes a plurality of dielectric layers 111 and serves to form a predetermined gap between the first capacitor portion and the second capacitor portion.

A first external electrode 130 includes a first internal layer 131 connected to the first and third internal electrodes 121 and 123 and containing copper (Cu), and a first external layer 132 covering the first internal layer 131 and containing silver (Ag) and palladium (Pd).

The first internal layer 131 of the first external electrode 130 may include a first connection portion 131a formed on the third surface 3 of the capacitor body 110 and connected to the exposed portions of the first and third internal electrodes 121 and 123, and a first band portion 131b extending from the first connection portion 131a to a portion of the first surface 1 of the capacitor body 110.

In this case, the first band portion 131b may additionally extend to a portion of the second surface 2 and portions of the fifth and sixth surfaces 5 and 6 of the capacitor body 110 to increase fixing strength.

The first external layer 132 of the first external electrode 130 may be formed by applying a paste containing Ag and Pd to the surface of the first internal layer 131, and may include a third connection portion 132a formed on the first connection portion 131a and a third band portion 132b extending from the third connection portion 132a to cover the first band portion 131b.

The first external layer 132 may serve to enhance corrosion resistance of the first external electrode 130 at a high temperature.

The second external electrode 140 includes a second internal layer 141 connected to the second and fourth internal electrodes 122 and 124 and containing copper (Cu), and a second external layer 142 covering the second internal layer 141 and containing silver (Ag) and palladium (Pd).

The second internal layer 141 of the second external electrode 140 may include a second connection portion 141a formed on the fourth surface 4 of the capacitor body 110 and connected to exposed portions of the second and fourth internal electrodes 122 and 124, and a second band portion 141b extending from the second connection portion 141a to a portion of the first surface 1 of the capacitor body 110.

In this case, the second band portion 141b may extend to portions of the second surface 2 and portions of the fifth and sixth surfaces 5 and 6 of the capacitor body 110 to increase the fixing strength.

In addition, the second external layer 142 of the second external electrode 140 may be formed by applying a paste containing Ag and Pd on the surface of the second internal layer 141, and may include a fourth connection portion 142a formed on the second connection portion 141a and a fourth band portion 143b extending from the fourth connection portion 142a to cover the second band portion 141b.

The second external layer 142 may serve to enhance corrosion resistance of the second external electrode 140 at a high temperature.

Figure 5:
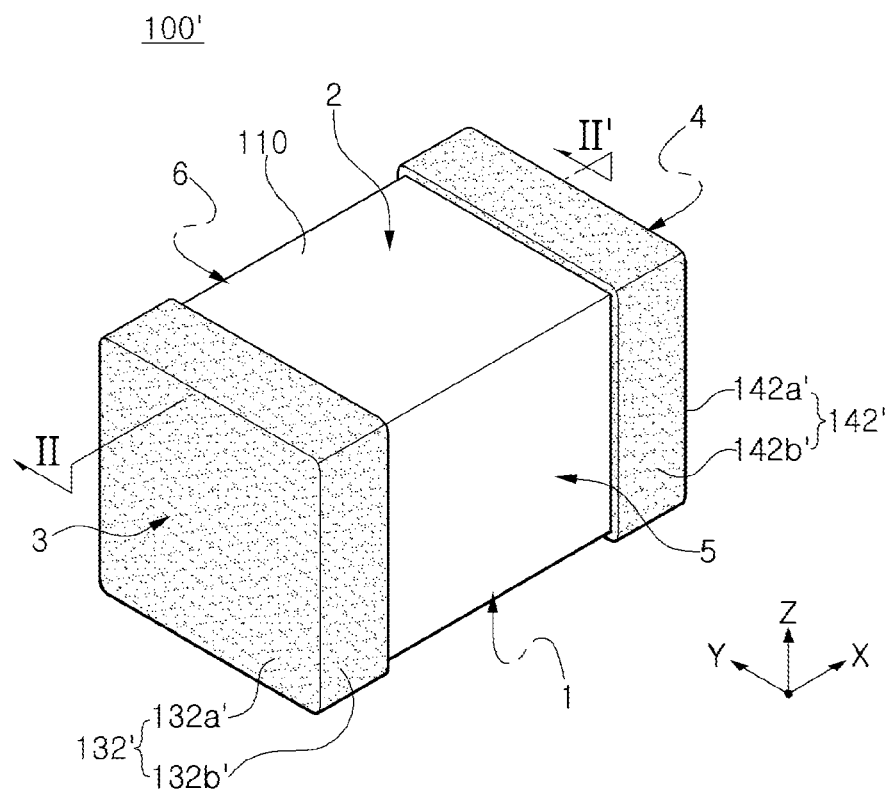
FIG. 5 is a schematic perspective view illustrating a multilayer capacitor according to another embodiment of the present disclosure.
Figure 6:
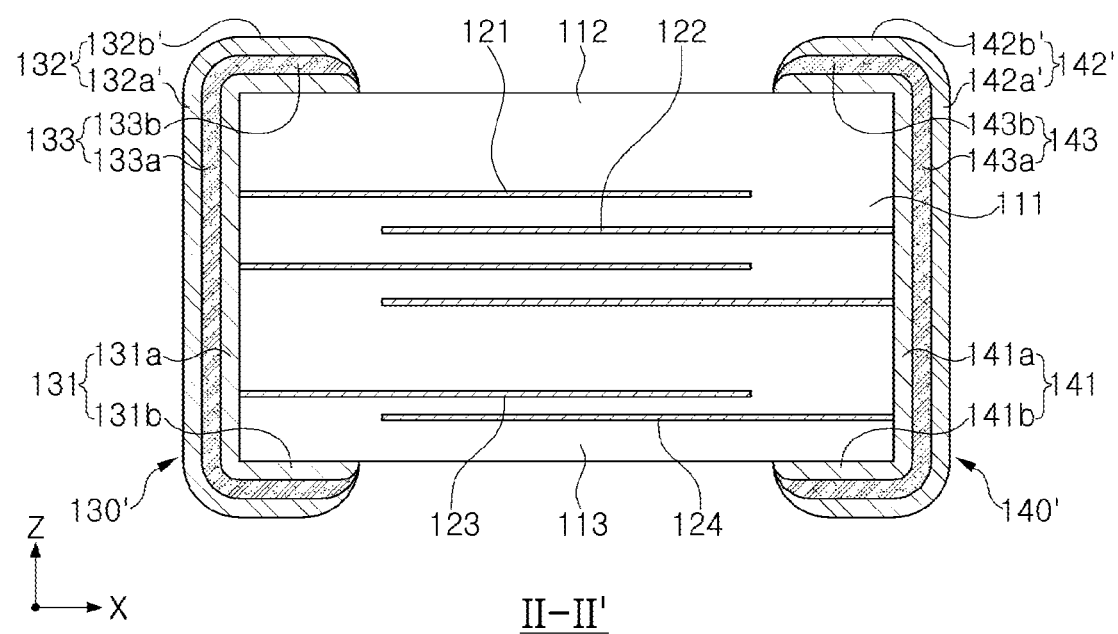
FIG. 6 is a cross-sectional view taken along line II-II' of the multilayer capacitor of FIG. 5.

FIG. 5 is a schematic perspective view illustrating a multilayer capacitor according to another embodiment of the present disclosure, and FIG. 6 is a cross-sectional view taken along line II-II' of the multilayer capacitor of FIG. 5.

Here, since the structures of the capacitor body 110 and the first and second internal layers 131 and 141 of the first and second external electrodes 130 and 140 are similar to those of the above-described embodiment, detailed descriptions thereof will be omitted to avoid duplication, and first and second intermediate layers 133 and 143 and first and second external layers 132' and 142' of first and second external electrodes 130' and 140' having a structure different from those of the above-described embodiment will be described in detail.

Referring to FIGS. 5 and 6, as another example of the present disclosure, a multilayer capacitor 100' of the present embodiment may further include a first intermediate layer 133, in a first external electrode 130', which may cover a first internal layer 131, and containing nickel (Ni).

The first intermediate layer 133 may be formed by plating a surface of the first internal layer 131, and may include a fifth connection portion 133a formed on a first connection portion 131a, and a fifth band portion 133b extending from the fifth connection portion 133a to cover a first band portion 131b.

In addition, a first external layer 132' of the first external electrode 130' may cover the first intermediate layer 133 and may include palladium.

The first external layer 132' may be formed by plating a surface of the first intermediate layer 133, and may include a third connection portion 132a' formed on the fifth connection portion 133a, and a third band portion 132b' extending from the third connection portion 132a' to cover the fifth band portion 133b.

In addition, a second external electrode 140' may include a second intermediate layer 143 covering a second internal layer 141 and containing nickel (Ni).

The second intermediate layer 143 may be formed by plating a surface of the second internal layer 141, and may include a sixth connection portion 143a formed on a second connection portion 141a, and a sixth band portion 143b extending from the sixth connection portion 143a to cover a second band portion 141b.

In addition, a second external layer 142' of the second external electrode 140' may cover the second intermediate layer 143 and may include palladium.

The second external layer 142' may be formed by plating a surface of the second intermediate layer 143, and may include a fourth connection portion 142a' formed on the sixth connection portion 143a, and a fourth band portion 142b' extending from the fourth connection portion 142a' to cover the sixth band portion 143b.

As described above, when the first and second intermediate layers 133 and 143 are formed by plating the first and second external electrodes 130' and 140' to cover the first and second internal layers 131 and 141, and by plating the first and second external layers 132' and 142' to cover the first and second intermediate layers 133 and 143, corrosion resistance may be further improved at a high temperature.

In order to secure a high temperature coefficient of capacitance (TCC) through TCC planarization such that the multilayer capacitor may be used in a 150° C. high temperature environment, the dielectric layer 111 of the capacitor body 110 of the present embodiment may be preferably comprised of $BaCaTiO_3$ (BCT) or BT+BCT.

In addition, the first and second external layers 132 and 142 may be mounted on an alumina substrate having an electrode pad made of silver and palladium with a conductive adhesive formed of an Ag+epoxy component, rather than a substrate mounting method using a conventional Sn solder and epoxy, in order to improve deterioration of a substrate joint portion due to repeated high temperature-low temperature cycles.

In this case, using the conductive adhesive including the Ag filler is to improve the corrosion resistance by eliminating a potential difference by including the same metal as Ag contained in the electrode pad of the alumina substrate.

For example, the multilayer capacitor 100 of the present embodiment may be employed as a product mounted on a substrate using a conductive adhesive and requires high temperature reliability of 150° C. or higher.

In addition, in the present embodiment, a decrease in bonding strength of the external layer of the external electrode with the substrate may not occur, in a portion contacting a conductive adhesive when mounted on the substrate.

In addition, since the external layer does not contain tin, and palladium contained in the external layer inhibits oxidation of silver (Ag) contained in the conductive adhesive and the electrode pad, reliability problems at high temperatures can be prevented from occurring.

In addition, an equivalent series inductance (ESL) of the multilayer capacitor may be reduced even in a high temperature environment.

As set forth above, according to an embodiment of the present disclosure, when a multilayer capacitor is mounted on a substrate using a conductive adhesive, there is an effect of enhancing high-temperature reliability.

While exemplary embodiments have been shown and described above, it will be apparent to those skilled in the art that modifications and variations could be made without departing from the scope of the present invention, as defined by the appended claims.

What is claimed is:

1. A multilayer capacitor, comprising:
a capacitor body in which a first capacitor portion and a second capacitor portion are disposed to face each other with a connection region disposed therebetween, the connection region having a predetermined thickness in which no internal electrode is disposed; and first and second external electrodes disposed on respective end portions of the capacitor body opposite each other in a longitudinal direction, wherein the first capacitor portion comprises first and second internal electrodes alternately disposed and exposed through respective surfaces of the first capacitor portion opposing each other in the longitudinal direction, and having a dielectric layer interposed between the first and second internal electrodes, the second capacitor portion comprises third and fourth internal electrodes alternately disposed and exposed through respective surfaces of the second capacitor portion opposing each other in the longitudinal direction, and having a dielectric layer interposed between the third and fourth internal electrodes, the predetermined thickness of the connection region is larger than thicknesses of the dielectric layers of the first and second capacitor portions, the first external electrode comprises a first internal layer connected to the first and third internal electrodes and containing copper (Cu), and a first external layer covering the first internal layer and containing silver (Ag) and palladium (Pd), the second external electrode comprises a second internal layer connected to the second and fourth internal electrodes and containing copper, and a second external layer covering the second internal layer and containing silver and palladium, and at least one of the first external layer or the second external layer includes as an outermost layer a fired electrode layer without resin.

2. The multilayer capacitor of claim 1, wherein the first capacitor portion includes two or more first internal electrodes and two or more second internal electrodes alternately disposed with dielectric layers therebetween, the first second capacitor portion includes one or more third internal electrodes and one or more fourth internal electrodes alternately disposed with dielectric layers therebetween, and a number of laminated layers of the first and second internal electrodes is greater than a number of laminated layers of the third and fourth internal electrodes.

3. The multilayer capacitor of claim 2, wherein the capacitor body has a surface, adjacent to the second capacitor portion, as a mounting surface.

4. The multilayer capacitor of claim 1, wherein the capacitor body comprises a first surface and a second surface opposing each other, a third surface and a fourth surface connected to the first and second surfaces and opposing each other, and a fifth surface and a sixth surface connected to the first and second surfaces and connected to the third and fourth surfaces and opposing each other, the first and second internal layers of the first and second external electrodes respectively comprise first and second connection portions disposed on the third and fourth surfaces of the capacitor body, respectively, and connected to exposed portions of the internal electrodes, and first and second band portions extending from the first and second connection portions, respectively, to a portion of the first surface of the capacitor body.

5. The multilayer capacitor of claim 4, wherein the first and second external layers of the first and second external electrodes respectively comprise third and fourth connection portions disposed on the first and second connection portions, respectively, and third and fourth band portions extending from the third and fourth connection portions, respectively, to respectively cover the first and second band portions.

6. A multilayer capacitor comprising: a capacitor body comprising a first capacitor portion including first and second internal electrodes stacked with a first dielectric layer therebetween, a second capacitor portion including third and fourth internal electrodes stacked with a second dielectric layer therebetween, and a connection region free of internal electrodes, disposed between the first and second capacitor portions, and having a larger thickness than the first and second dielectric layers; a first multi-layer electrode connecting the first and third internal electrodes of the first and second capacitor portions to each other, the first multi-layer electrode including an internal layer containing copper (Cu) and an external layer containing palladium (Pd); and a second multi-layer electrode connecting the second and fourth internal electrodes of the first and second capacitor portions to each other, the second multi-layer electrode including an internal layer containing copper (Cu) and an external layer containing palladium (Pd), wherein at least one of the external layer of the first multi-layer electrode or the external layer of the second multi-layer electrode includes as an outermost layer a fired electrode layer without resin.

7. The multilayer capacitor of claim 6, wherein the first multi-layer electrode directly contacts both the first and third internal electrodes of the first and second capacitor portions, and the second multi-layer electrode directly contacts both the second and fourth internal electrodes of the first and second capacitor portions.

8. The multilayer capacitor of claim 7, wherein the first and second multi-layer electrodes are disposed on opposing external surfaces of the capacitor body.

9. The multilayer capacitor of claim 7, wherein the first and second multi-layer electrodes are disposed on a same external surface of the capacitor body.

10. The multilayer capacitor of claim 6, wherein the external layer of the first multi-layer electrode is free of tin (Sn).

11. The multilayer capacitor of claim 6, wherein the external layers of the first and second multi-layer electrodes contain silver (Ag) and palladium (Pd).

12. The multilayer capacitor of claim 6, wherein each of the first and second multi-layer electrodes further includes an intermediate layer disposed between the internal layer and the external layer and containing nickel (Ni).

13. A multilayer capacitor, comprising: a capacitor body in which a first capacitor portion and a second capacitor portion are disposed to face each other with a connection region disposed therebetween, the connection region having a predetermined thickness in which no internal electrode is disposed; and first and second external electrodes disposed on respective end portions of the capacitor body opposite each other in a longitudinal direction, wherein the first capacitor portion comprises first and second internal electrodes alternately disposed and exposed through respective surfaces of the first capacitor portion opposing each other in the longitudinal direction, and having a dielectric layer interposed between the first and second internal electrodes, the second capacitor portion comprises third and fourth internal electrodes alternately disposed and exposed through respective surfaces of the second capacitor portion opposing each other in the longitudinal direction, and having a dielectric layer interposed between the third and fourth internal electrodes, the predetermined thickness of the connection region is larger than thicknesses of the dielectric layers of the first and second capacitor portions, at least one of the dielectric layers comprises $BaCaTiO_3$ (BCT) or $BaTiO_3$ (BT)+BCT, the first external electrode comprises a first internal layer and a first external layer covering the first internal layer, the second external electrode comprises a second internal layer and a second external layer covering the second internal layer, and at least one of the first external layer or the second external layer includes as an outermost layer a fired electrode layer without resin.

14. The multilayer capacitor of claim 13, wherein a number of laminated layers of the first and second internal electrodes is greater than a number of laminated layers of the third and fourth internal electrodes.

15. The multilayer capacitor of claim 13, wherein the capacitor body comprises a first surface and a second surface opposing each other, a third surface and a fourth surface connected to the first and second surfaces and opposing each other, and a fifth surface and a sixth surface connected to the first and second surfaces and connected to the third and fourth surfaces and opposing each other, the first and second internal layers of the first and second external electrodes respectively comprise first and second connection portions disposed on the third and fourth surfaces of the capacitor body, respectively, and connected to exposed portions of the internal electrodes, and first and second band portions extending from the first and second connection portions, respectively, to a portion of the first surface of the capacitor body.

16. The multilayer capacitor of claim 15, wherein the capacitor body has a surface, adjacent to the second capacitor portion, as a mounting surface.

* * * * *